(12) United States Patent
Fukuhara et al.

(10) Patent No.: US 11,093,807 B2
(45) Date of Patent: Aug. 17, 2021

(54) IMAGE FORMING SYSTEM

(71) Applicant: CANON KABUSHIKI KAISHA, Tokyo (JP)

(72) Inventors: Riki Fukuhara, Funabashi (JP); Toshiyuki Miyake, Nagareyama (JP); Yutaka Ando, Toride (JP); Akihiro Arai, Toride (JP); Yuichiro Oda, Nagareyama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/991,966

(22) Filed: May 29, 2018

(65) Prior Publication Data
US 2018/0349079 A1 Dec. 6, 2018

(30) Foreign Application Priority Data

Jun. 1, 2017 (JP) .............................. JP2017-109254

(51) Int. Cl.
*G06K 15/00* (2006.01)
*G06K 15/02* (2006.01)
*G06F 3/12* (2006.01)

(52) U.S. Cl.
CPC ......... *G06K 15/027* (2013.01); *G06F 3/1208* (2013.01); *G06F 3/1237* (2013.01); *G06F 3/1288* (2013.01)

(58) Field of Classification Search
CPC combination set(s) only.
See application file for complete search history.

(56) References Cited

U.S. PATENT DOCUMENTS

| | | | | |
|---|---|---|---|---|
| 2007/0263242 A1* | 11/2007 | Takahashi | .......... | G03G 15/6508 358/1.14 |
| 2009/0161127 A1* | 6/2009 | Schweid | .............. | H04N 1/6033 358/1.9 |
| 2012/0188596 A1* | 7/2012 | Niles | ..................... | G06F 3/1229 358/1.15 |

(Continued)

FOREIGN PATENT DOCUMENTS

| | | |
|---|---|---|
| JP | 2009-004865 A | 1/2009 |
| JP | 2015-60065 A | 3/2015 |

(Continued)

*Primary Examiner* — Barbara D Reinier
(74) *Attorney, Agent, or Firm* — Canon U.S.A., Inc. IP Division

(57) ABSTRACT

An image forming apparatus includes an image processor performing image processing to image data, an image forming unit forming an image on a sheet based on the image data, and a controller changing an image forming condition of the image forming unit based on user information, in a case where a first measuring image is formed by the image forming unit to generate a first conversion condition for image data conversion in image processing to be performed by an external image processing apparatus, controlling the image forming unit based on the changed image forming condition, and in a case where a second measuring image is formed by the image forming unit to generate a second conversion condition for image data conversion in image processing to be performed by the image processor, controlling the image forming unit based on a default image forming condition.

15 Claims, 12 Drawing Sheets

| CALIBRATION MODE | CORRECTION TARGET | FIXING TEMPERATURE | | SECONDARY TRANSFER VOLTAGE |
|---|---|---|---|---|
| | | FIRST | SECOND | |
| AUTOMATIC TONE CORRECTION | SPECIFIED TONER ADHERED AMOUNT TARGET | 160°C | 170°C | 3000V |
| DFE CALIBRATION | TONE CHARACTERISTICS AT TIME OF PREPARATION OF COLOR CONVERSION PROFILE | DETERMINED IN ACCORDANCE WITH USER SETTING VALUE | | |

(56) References Cited

U.S. PATENT DOCUMENTS

| | | | |
|---|---|---|---|
| 2013/0271788 A1* | 10/2013 | Utsunomiya | G03G 15/55 |
| | | | 358/1.15 |
| 2013/0278952 A1* | 10/2013 | Suzuki | G06K 15/02 |
| | | | 358/1.9 |
| 2014/0160498 A1 | 6/2014 | Yano | |
| 2016/0352976 A1* | 12/2016 | Kuroiwa | H04N 1/6027 |

FOREIGN PATENT DOCUMENTS

| | | | |
|---|---|---|---|
| JP | 2016-102973 | * | 6/2016 |
| JP | 2016-102973 A | | 6/2016 |

\* cited by examiner

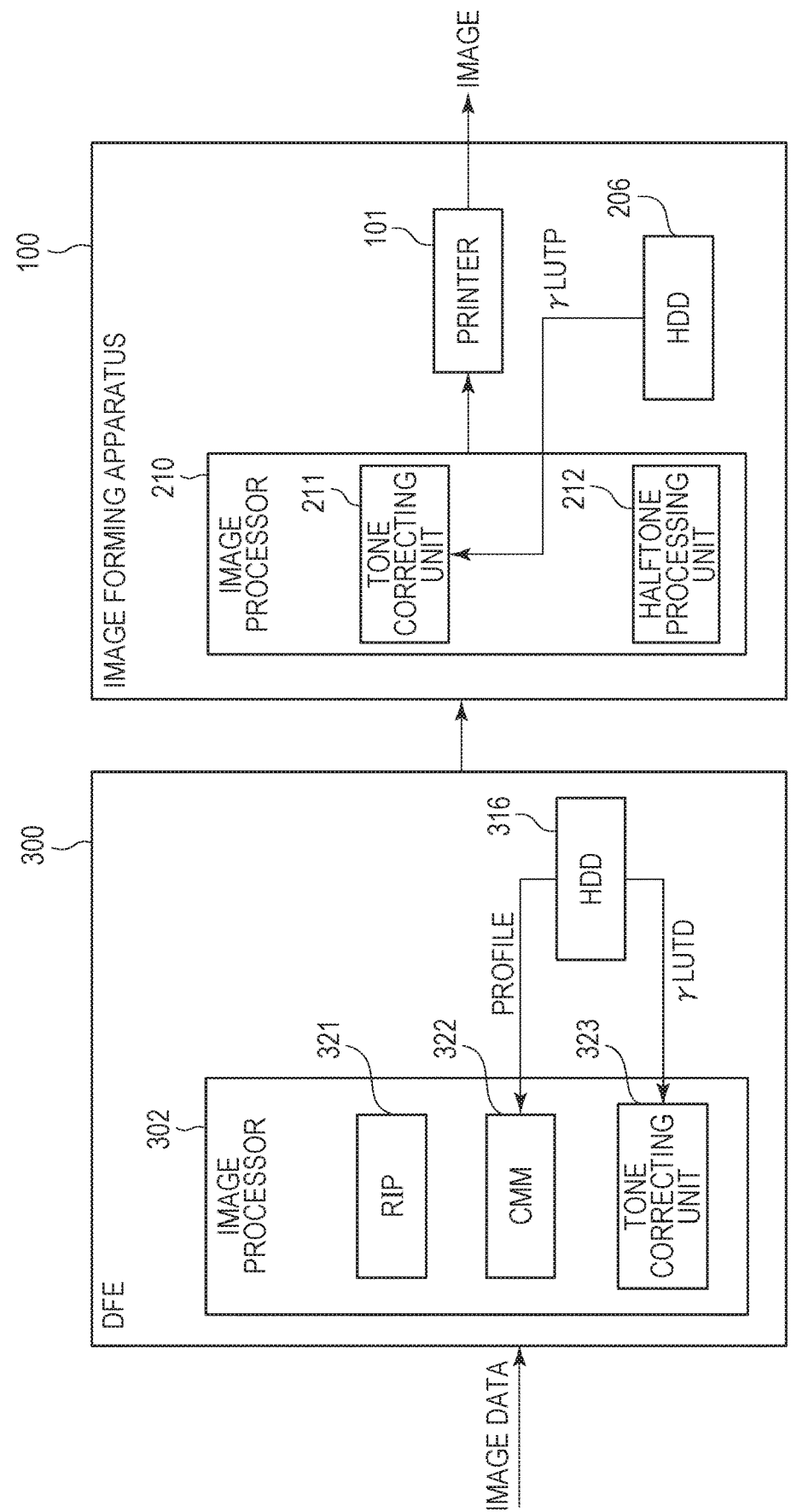

FIG. 14A

| CALIBRATION MODE | CORRECTION TARGET | FIXING TEMPERATURE | | SECONDARY TRANSFER VOLTAGE |
| --- | --- | --- | --- | --- |
| | | FIRST | SECOND | |
| AUTOMATIC TONE CORRECTION | SPECIFIED TONER ADHERED AMOUNT TARGET | 160°C | 170°C | 3000V |
| DFE CALIBRATION | TONE CHARACTERISTICS AT TIME OF PREPARATION OF COLOR CONVERSION PROFILE | DETERMINED IN ACCORDANCE WITH USER SETTING VALUE | | |

FIG. 14B

| GLOSS LEVEL SETTING VALUE | -3 | -2 | -1 | 0 | 1 | 2 | 3 |
| --- | --- | --- | --- | --- | --- | --- | --- |
| FIRST FIXING | 150°C | 155°C | 155°C | 160°C | 165°C | 165°C | 170°C |
| SECOND FIXING | 165°C | 165°C | 170°C | 170°C | 170°C | 175°C | 175°C |

FIG. 14C

| SECONDARY TRANSFER VOLTAGE SETTING VALUE | -3 | -2 | -1 | 0 | 1 | 2 | 3 |
| --- | --- | --- | --- | --- | --- | --- | --- |
| SECONDARY TRANSFER VOLTAGE | 2250V | 2500V | 2750V | 3000V | 3250V | 3500V | 3700V |

IMAGE FORMING SYSTEM

BACKGROUND OF THE INVENTION

Field of the Invention

The aspect of the embodiments relates to tone correction control.

Description of the Related Art

An electrophotographic image forming apparatus forms an electrostatic latent image on a photosensitive member based on image data and develops the electrostatic latent image with use of a developing agent in a developing unit to form an image. It is known that the density of the image formed by the image forming apparatus changes depending on the state of the developing agent in the developing unit and the temperature and the humidity inside the image forming apparatus.

Hence, the image forming apparatus forms a measuring image on a sheet, measures the measuring image on the sheet by means of a sensor, and controls image forming conditions based on the measurement result of the sensor so that the density of the image formed on the sheet may be desired density.

Also, in recent years is known an image forming system forming an image with use of an image forming apparatus and an image processing apparatus connected to the image forming apparatus. In this image forming system, calibration can be executed in each of the apparatuses.

For example, in an image forming system described in US2014/0160498, previous image forming conditions and present image forming conditions are compared each time an image forming apparatus updates image forming conditions, and an image processing apparatus is calibrated in a case where the change amount is larger than a predetermined amount.

In the calibration, in which the image forming conditions are controlled based on the measurement result of the sensor in the image forming apparatus, a recommended sheet is to be used. The reason for this is that the recommended sheet is designed so that a measurement result of a measuring image formed on the recommended sheet can be converted into the amount of the developing agent adhered. That is, by generating image forming conditions that cause the amount of the developing agent adhered to correspond to a targeted adhered amount, tone characteristics of the image forming apparatus can be corrected into ideal tone characteristics.

Meanwhile, a user can arbitrarily change a gloss level of an image formed by the image forming apparatus. When the user sets the gloss level, the image forming apparatus changes a fixing temperature of a fixing unit, for example.

However, in a case where the fixing temperature is changed when calibration processing for controlling the image forming conditions of the image forming apparatus is executed, the amount of the developing agent adhered to the sheet will change. Thus, even when the image forming conditions are determined based on the measurement result of the measuring image, the tone characteristics of the image forming apparatus are not ideal tone characteristics.

On the other hand, in the calibration of the image processing apparatus, the tone characteristics are adjusted to correspond to tone characteristics at the time of preparing a user's arbitrary color conversion profile. For this reason, the amount of the developing agent adhered to the sheet does not need to be kept. The density of the measuring image formed based on the gloss level arbitrarily set by the user is detected, and conversion conditions of the image processing apparatus are generated so that the density of the measuring image may be targeted density. In other words, even in a case where the conversion conditions are generated based on predetermined image forming conditions, ideal density may not be achieved when an image is formed based on the gloss level arbitrarily set by the user.

Accordingly, the image forming apparatus is required to control image forming conditions appropriately in accordance with calibration.

SUMMARY OF THE INVENTION

An image forming apparatus according to the present invention is connected to an external image processing apparatus to enable communication. The image forming apparatus includes an image processor configured to perform image processing to image data, an image forming unit configured to form an image on a sheet based on the image data, and a controller configured to change an image forming condition of the image forming unit based on user information, in a case where a first measuring image is formed by the image forming unit to generate a first conversion condition for image data conversion in image processing to be performed by the external image processing apparatus, control the image forming unit based on the changed image forming condition, and in a case where a second measuring image is formed by the image forming unit to generate a second conversion condition for image data conversion in image processing to be performed by the image processor, control the image forming unit based on a default image forming condition without using the changed image forming condition.

Further features of the disclosure will become apparent from the following description of exemplary embodiments (with reference to the attached drawings).

BRIEF DESCRIPTION OF THE DRAWINGS

FIG. 4 is a schematic view illustrating input/output of data in an image forming operation.

FIG. 14A is a table illustrating a relationship between a calibration mode and test chart printing conditions.

FIG. 14B is a table illustrating a relationship between a gloss level setting value and a fixing temperature.

FIG. 14C is a table illustrating a relationship between a secondary transfer voltage setting value and secondary transfer voltage.

DESCRIPTION OF THE EMBODIMENTS

Figure 1:
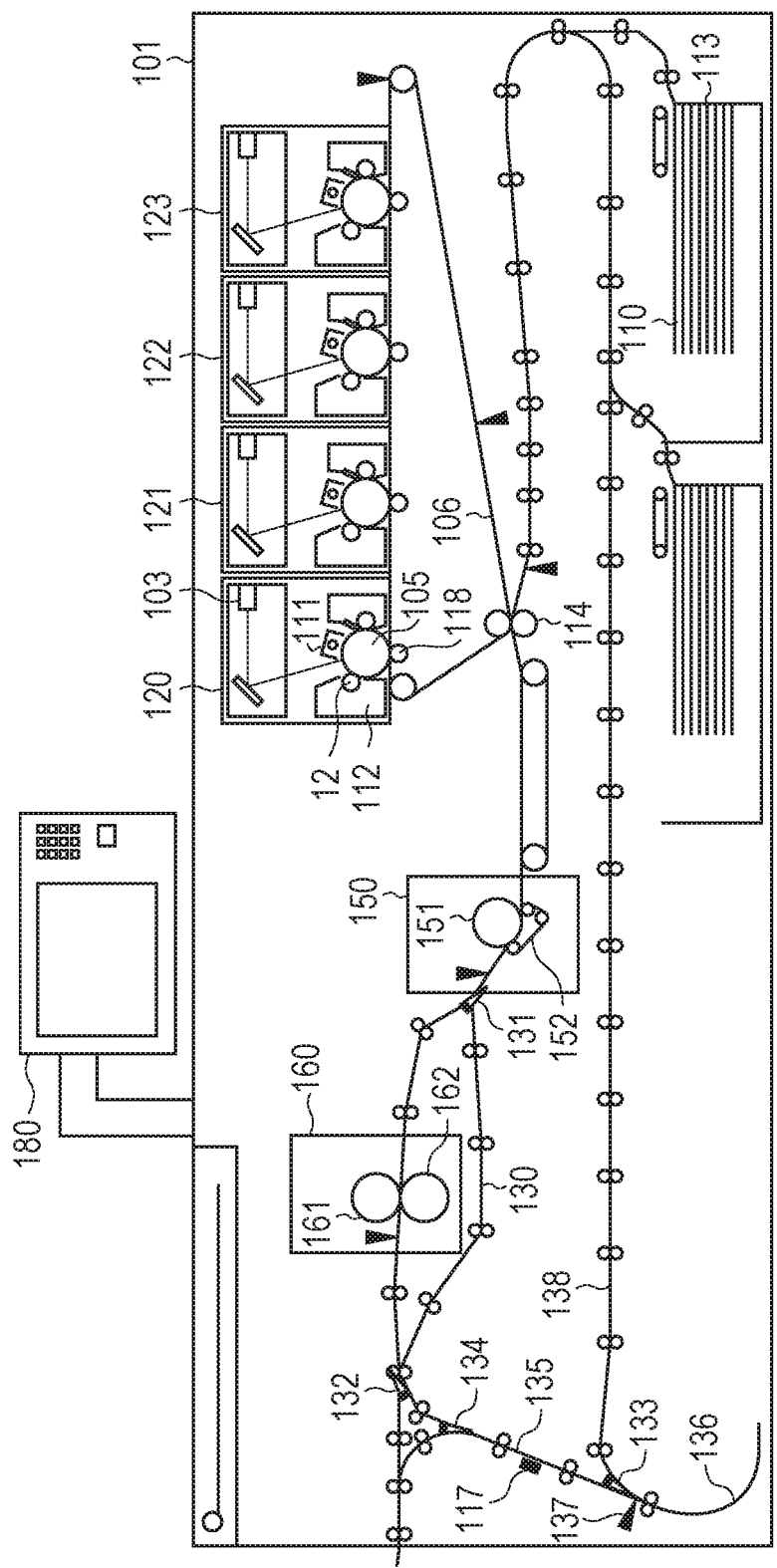
FIG. 1 is a schematic cross-sectional view of an image forming apparatus 100.

Hereinbelow, embodiments of the disclosure will be described with reference to the drawings. An image forming system according to an embodiment includes an image forming apparatus 100 and an image processing apparatus (hereinbelow referred to as a DFE) 300 connected to the image forming apparatus 100 to enable communication.
(Configuration of Image Forming Apparatus)

The image forming apparatus 100 will be described based on FIG. 1. The image forming apparatus 100 includes a printer 101 and an operating unit 180. The printer 101 includes four stations 120, 121, 122, and 123 each forming an image of a color component. The station 120 forms a yellow image, the station 121 forms a magenta image, the station 122 forms a cyan image, and the station 123 forms a black image.

Figure 2:
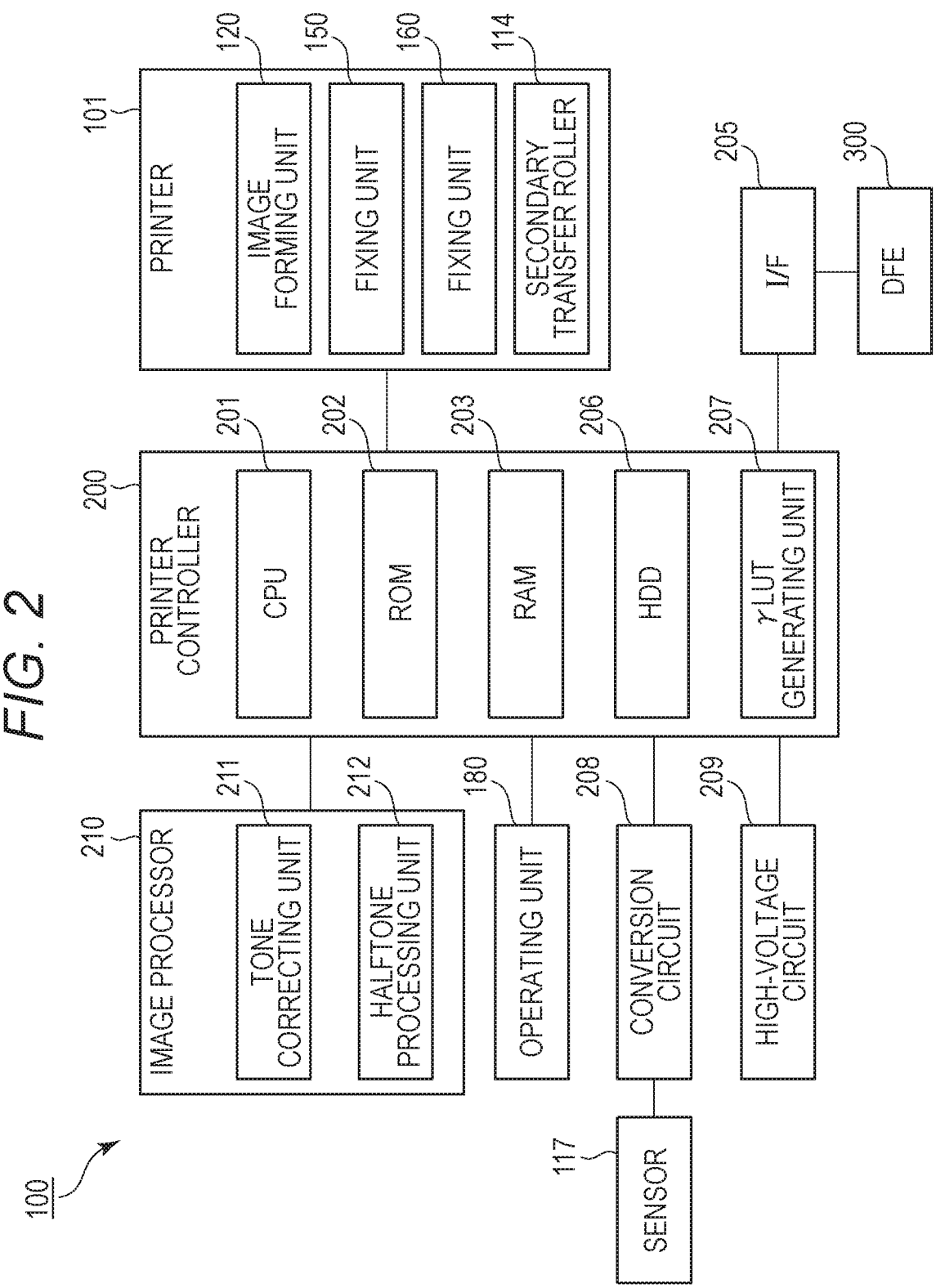
FIG. 2 is a control block diagram of the image forming apparatus 100.

Since each of the stations has the same configuration, a configuration of the station 120 forming a yellow image will be described. A photosensitive drum 105 is a photosensitive body having a photosensitive layer on a surface thereof. An electrostatic charger 111 is supplied with charged voltage from a high-voltage circuit 209 (FIG. 2). The electrostatic charger 111 charges the surface of the photosensitive drum 105 based on the charged voltage. Laser of an exposing device 103 controlled based on image data scans the photosensitive drum 105 to cause an electrostatic latent image to be formed on the photosensitive drum 105. The intensity of the laser generated from the exposing device 103 (hereinbelow referred to as LPW) is controlled based on driving current, for example. A developing unit 112 includes a storing unit having stored therein a developing agent and a developing sleeve 12 rotated with the developing agent in the storing unit carried. The developing agent is a two-component developing agent containing toner and magnetic carrier, for example. The developing unit 112 develops the electrostatic latent image with use of the developing agent in the storing unit. An image is thus carried on the photosensitive drum 105.

A primary transfer roller 118 transfers a toner image on the photosensitive drum 105 onto an intermediate transfer belt 106 when primary transfer voltage is applied by the high-voltage circuit 209 (FIG. 2). Toner images of the respective colors formed in the respective stations 120, 121, 122, and 123 are transferred to overlap onto the intermediate transfer belt 106 to cause a full-color toner image to be carried onto the intermediate transfer belt 106. The toner image carried on the intermediate transfer belt 106 is conveyed to a secondary transfer roller 114 as the intermediate transfer belt 106 is rotated. The intermediate transfer belt 106 is an example of a transfer member carrying an image formed by the printer 101.

A sheet 110 housed in a housing 113 is conveyed by conveying rollers to reach the secondary transfer roller 114 at the same time as the toner image carried on the intermediate transfer belt 106. The secondary transfer roller 114 is supplied with secondary transfer voltage from the high-voltage circuit 209 (FIG. 2) and transfers the toner image carried on the intermediate transfer belt 106 onto the sheet 110. The sheet 110 to which the toner image has been transferred is then conveyed to a fixing unit 150 and a fixing unit 160.

The fixing units 150 and 160 heat and press the toner image transferred to the sheet 110 to thermally fix the toner image to the sheet 110. The fixing unit 150 includes a fixing roller 151 including a heater heating the sheet 110 and a pressing belt 152 bringing the sheet 110 into pressure contact with the fixing roller 151. The fixing unit 160 is arranged further to a downstream side in a conveying direction of the sheet 110 than the fixing unit 150. The fixing unit 160 adds gloss to the toner image on the sheet 110 that has passed the fixing unit 150. The fixing unit 160 includes a fixing roller 161 including a heater heating the sheet and a pressing roller 162.

In a case where the image is fixed to the sheet 110 in a mode of adding gloss, or in a case where the image is fixed to the sheet 110 requiring a large amount of heat for fixing such as a thick sheet, the sheet 110 is conveyed to the fixing unit 160 after passing the fixing unit 150. In a case where the image is fixed to the sheet 110 such as a plain sheet and a thin sheet, the sheet 110 is conveyed along a conveyance path 130 bypassing the fixing unit 160 after passing the fixing unit 150. To control whether the sheet 110 is conveyed to the fixing unit 160 or is conveyed to bypass the fixing unit 160, the angle of a flapper 131 is controlled.

A flapper 132 is a guide member switching between guiding the sheet 110 to a conveyance path 135 and guiding the sheet 110 to a conveyance path 139 for discharge. The sheet 110 conveyed along the conveyance path 135 is conveyed to a reversing unit 136. When a reversing sensor 137 provided in the conveyance path 135 detects a rear end of the sheet 110, the conveying direction of the sheet 110 is reversed.

A flapper 133 is a guide member switching between guiding the sheet 110 to a conveyance path 138 for double-sided image formation and guiding the sheet 110 to the conveyance path 135. In a case where a face-down mode is executed, the sheet 110 is conveyed to the conveyance path 135 again and is discharged from the image forming apparatus 100.

Conversely, in a case where a double-sided printing mode is executed, the sheet 110 is conveyed along the conveyance path 138 to the transfer roller 114 again. In the case where the double-sided printing mode is executed, the image is fixed to a first side of the sheet 110, is reversed at the reversing unit 136, and is conveyed along the conveyance path 138 to the secondary transfer roller 114, and the image is formed onto a second side of the sheet 110.

A flapper 134 is a guide member guiding the sheet 110 to a conveyance path for discharging the sheet 110 from the image forming apparatus 100. In a case where the sheet 110 is discharged in the face-down mode, the flapper 134 guides the sheet reversed at the reversing unit 136 to the conveyance path for discharge. The sheet 110 conveyed along the conveyance path for discharge is discharged from the image forming apparatus 100.

The conveyance path 135 is provided with a sensor 117 measuring the density of a measuring image on the sheet 110. Two sensors 117 are arranged in parallel in a direction perpendicular to the conveying direction of the sheet 110 to measure reflected light from the two-row measuring image.

The operating unit 180 includes a liquid crystal display and a key input unit. The key input unit includes a start button, a cancel button, a menu button, and a numeric keypad mode selecting button, for example. The operating unit 180 is an interface allowing a user to input the number of sheets for image printing and a printing mode. The user can select a one-sided printing mode or the double-sided printing mode, execute the face-down mode, and select a monochrome mode or a color mode with use of the operating unit 180. Also, in the present embodiment, user information such as a gloss level setting value and a secondary transfer voltage setting value is input in the operating unit 180. It is to be noted that, in a case where the operating unit 180 is a touch panel display, the operating unit 180 may be configured to include no key input unit.

FIG. 2 is a control block diagram of the image forming apparatus 100. A printer controller 200 is a control circuit controlling respective units of the image forming apparatus 100. The printer controller 200 includes a CPU 201, a ROM 202, a RAM 203, an HDD 206, and a γLUT generating unit 207. The ROM 202 has stored therein a control program that causes the CPU 201 to execute processing of below-mentioned flowcharts. The RAM 203 is a system working memory to cause the CPU 201 to be operated.

The hard disk drive (HDD) 206 stores image data included in a print job, a tone correction table (γLUTP), and measuring image data used to cause the printer 101 to prepare a test chart A. It is to be noted that, although the image forming apparatus 100 according to the present embodiment is configured to include the HDD 206, an external storage device such as an SD card and a flash memory may be connected instead of the HDD 206.

An I/F 205 is an interface through which bitmap information with attributes (image data) is input from the DFE 300. The image data input through the I/F 205 is transferred to an image processor 210.

The image processor 210 is a control circuit executing image processing to the image data.

A tone correcting unit 211 executes various image processing to the input image data to convert the image data. When the state of the developing agent in the developing unit 112 and the temperature and the humidity inside the image forming apparatus 100 change, density characteristics (tone characteristics) of the output image formed by the image forming apparatus 100 will fluctuate. Thus, the tone correcting unit 211 converts an input value of the image data (an image signal value) into a signal value causing the printer 101 to form an image with targeted density so that the density characteristics (tone characteristics) of the image formed by the printer 101 may be ideal density characteristics.

The tone correcting unit 211 converts the image data based on the γLUTP stored in the HDD 206. The γLUTP is stored in the HDD 206 to correspond to corresponding halftone processing. The γLUTP is updated by the γLUT generating unit 207.

It is to be noted that the function of the tone correcting unit 211 may be fulfilled by an integrated circuit such as an ASIC or by the CPU 201, which converts the image data based on a pre-stored program. Also, the configuration of the tone correcting unit 211 is not limited to one in which the image data is converted based on the tone correction table γLUTP and may be one in which the image signal value is converted based on a conversion equation.

A halftone processing unit 212 provides the image data converted by the tone correcting unit 211 with halftoning appropriate for the type (attributes) of the image. The halftone processing unit 212 converts image data of a photo and image data of a graphic based on an image screen so that the photo and the graphic may be images excellent in tone characteristics. The halftone processing unit 212 converts image data of a text based on a text screen so that letters may be printed clearly. In a case where the user selects an error diffusion method, the halftone processing unit 212 converts the image data based on the error diffusion method. For example, in a case where moire is generated in a high-resolution image, the user selects halftoning using the error diffusion method to restrict the moire. It is to be noted that the aforementioned respective screens are illustrative only, and that the aspect of the embodiments is not limited to these screens. The image data screened by the halftone processing unit 212 is input into the printer 101.

Since the printer 101, the sensor 117, and the high-voltage circuit 209 have been described in FIG. 1, description thereof will be omitted here. A conversion circuit 208 converts an output value of the sensor 117 based on a not-illustrated conversion table. The output value output by the sensor 117 is converted into data related to the toner amount (the amount of toner adhered) based on the conversion table (not illustrated).

When printing conditions (image forming conditions) for forming an image on the sheet 110 are input through the operating unit 180 by the user, the CPU 201 stores the input printing conditions (image forming conditions) into the RAM 203. In the present embodiment, parameters that can be input are a setting value for controlling a gloss level of an image and a setting value of secondary transfer voltage at the time of transfer from the intermediate transfer belt 106 to the sheet 110. When the image forming apparatus 100 forms an image, the CPU 201 reads out the gloss level setting value and the secondary transfer voltage setting value stored in the RAM 203 to control a fixing temperature and secondary transfer voltage. It is to be noted that the image forming apparatus 100 may be configured to enable either the gloss level setting value or the secondary transfer voltage setting value to be controlled.

Figure 3:
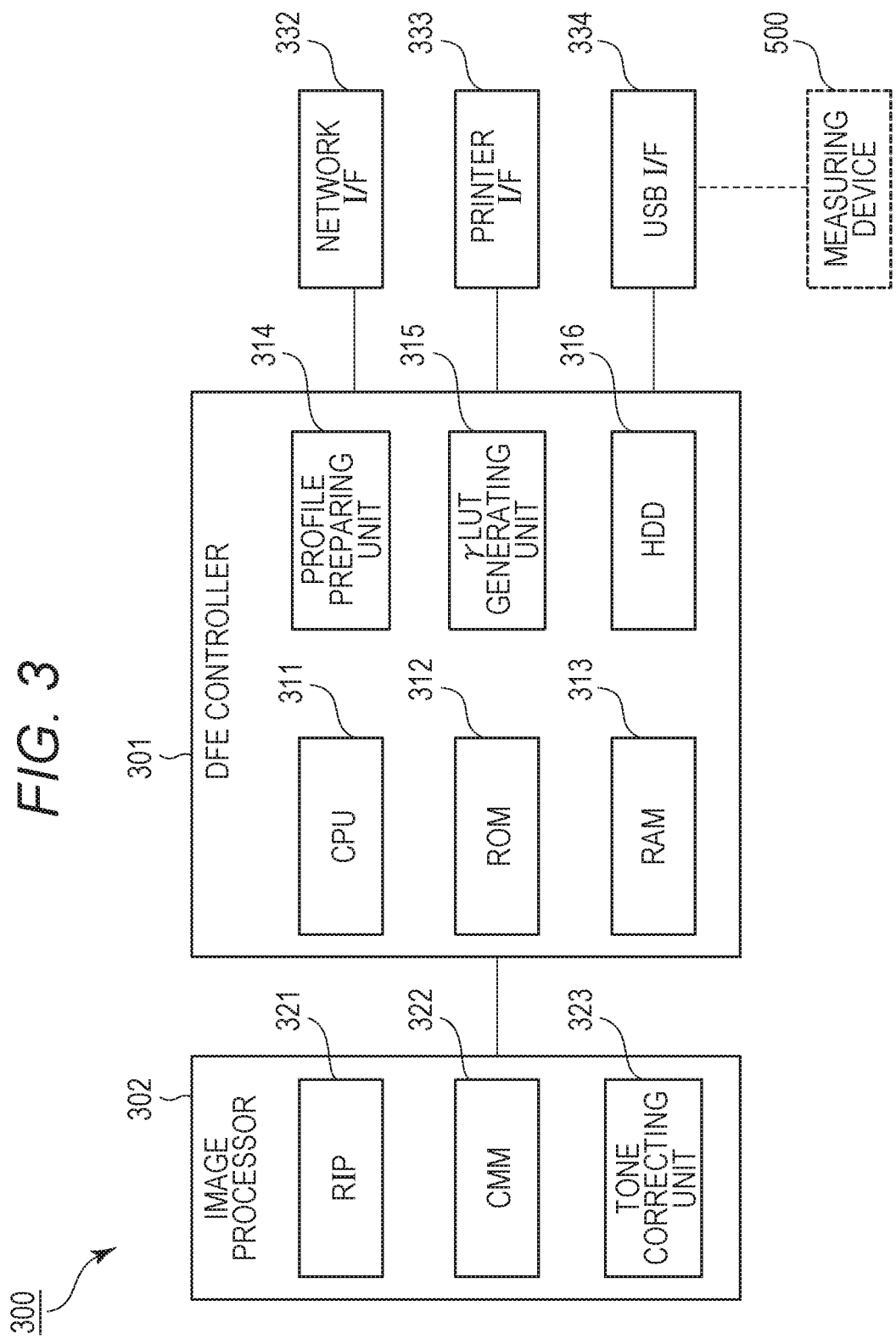
FIG. 3 is a control block diagram of an image processing apparatus (DFE) 300.

Next, the DFE 300 connected to the image forming apparatus 100 to enable communication will be described based on the control block diagram in FIG. 3. The DFE 300 is an image processing apparatus including a RIP (raster imaging processor) 321 analyzing image data transferred from a PC or the like and forming a bitmap image. The DFE 300 includes a DFE controller 301, an image processor 302, a network I/F 332, a printer I/F 333, and a USB I/F 334.

The DFE controller 301 includes a CPU 311, a ROM 312, and a RAM 313. The ROM 312 has stored therein a program to be executed by the CPU 311. The RAM 313 functions as a system working memory. The DFE controller 301 also includes a profile preparing unit 314, a γLUT generating unit 315, and an HDD 316.

The network I/F 332 is an interface through which the image data transferred from the PC is received. The DFE controller 301 transfers the image data input through the network I/F 332 into the image processor 302.

The image processor 302 includes the RIP 321, a color management module (CMM) 322 and a tone correcting unit 323. The RIP 321 analyzes the image data to acquire attributes of respective objects and converts the image data into bitmap data.

The CMM 322 executes color conversion based on profile data (input profile). Examples of the profile are a one-dimensional LUT (lookup table) controlling gamma of an input image signal of image data, a mixed color LUT called direct mapping, and a one-dimensional LUT controlling gamma of generated conversion data. Due to these tables, the input image signal expressed by a device-dependent color space is converted into device-independent image data (L*a*b*).

The CMM 322 also executes GAMUT conversion, light source type mismatch (also referred to as mismatch of color temperature settings) color conversion, and the like to the converted L*a*b* image data. In the GAMUT conversion, a mismatch between an input color space and an output color reproducible range of the image forming apparatus 100 is mapped. Hence, the input color space of the image data is converted into an output color space. The light source type mismatch color conversion is color conversion for adjusting a mismatch between the type of a light source at the time of input and the type of a light source at the time of observing an output matter. Hence, the image data (L*a*b*) is converted into image data (L*'a*'b*'). The image data (L*'a*'b*') is color-converted based on profile data (output profile). As a result, the image data (L*'a*'b*') is converted into a CMYK signal dependent on the output device (image forming apparatus 100) and is output to the tone correcting unit 323.

The tone correcting unit 323 performs various image processing to the input image data (CMYK signal) to correct the image data. The density of an image formed by the printer 101 (output image) is not desired density. The tone correcting unit 323 corrects an input value of the image data (image signal value) so that the density of the output image formed by the printer 101 may be desired density. For example, the tone correcting unit 323 corrects the image data based on a tone correction table (γLUTD) stored in the HDD 316. The HDD 316 has stored therein tone correction tables for the respective colors. The tone correction table (γLUTD) corresponds to a conversion condition for converting the image data.

The profile preparing unit 314 performs characterization of preparing a profile which is a multi-dimensional LUT (a table representing a correspondence relationship between a plurality of input values and a plurality of output values) for suppressing mixed color fluctuation. The profile preparing unit 314 according to the present embodiment prepares an ICC (International Color Consortium) profile, for example. It is to be noted that the profile preparing unit 314 may be configured to prepare a color matching profile other than the ICC profile. Profile preparing processing performed by the profile preparing unit 314 is described in Japanese Patent Laid-Open No. 2009-004865, for example. Description of the profile preparing processing is thus omitted. The profile prepared by the profile preparing unit 314 is stored in the HDD 316.

The γLUT generating unit 315 generates the tone correction table (γLUTD) having specified targeted tone characteristics with use of measurement data of a test chart measured by a measuring device 500 input via the USB I/F 334. The γLUTD is stored in the HDD 316.

The printer I/F 333 is an interface transferring image data to the printer 101 and receiving a measurement result of the sensor 117. The USB I/F 334 is an interface of the measuring device 500 that can be connected to the DFE 300. For example, in a case where the profile preparing unit 314 prepares a profile, Lab data corresponding to the measurement result of the test chart is input via the USB I/F 334. Also, for example, in a case where the γLUT generating unit 315 generates the γLUTD, density data corresponding to the measurement result of the test chart is input via the USB I/F 334. Meanwhile, the color measuring device 500 is a spectroscopic sensor measuring spectroscopic data (L*, a*, and b*). The color measuring device 500 is i1Pro2 (registered trademark) manufactured by X-Rite, for example.

Next, image forming processing will be described based on FIG. 4. When image data is input into the DFE 300 via the network I/F 332, in the DFE 300, the image processor 302 executes various image processing to the image data. For example, the CMM 322 executes color conversion processing of the image data based on the profile stored in the HDD 316, and the tone correcting unit 323 converts a signal value of the image data for each color based on the γLUTD for each color stored in the HDD 316.

Subsequently, the image data subject to the image processing in the DFE 300 is transferred to the image forming apparatus 100 via the printer I/F 333. The image processor 210 in the image forming apparatus 100 executes image processing to the image data. For example, the tone correcting unit 211 converts a signal value of the image data for each color based on the γLUTP for each color stored in the HDD 206. Also, the halftone processing unit 212 executes halftone processing appropriate for the object to the respective image data. The image data subject to the image processing in the image processor 210 is transferred to the printer 101, and the printer 101 forms an image on the sheet 110 based on the image data.

(Automatic Tone Correction)

Automatic tone correction executed by the image forming apparatus 100 according to the present embodiment will be described with reference to FIGS. 5A, 6, 9, 10, and 12. The automatic tone correction is control in which the toner amount in a pre-specified recommended sheet is detected, and in which the tone characteristics of the printer 101 are corrected so that the amount of toner adhered to the recommended sheet may be a targeted amount.

Before executing the automatic tone correction, the CPU 201 of the printer controller 200 controls charged potential, exposure intensity, and development bias so that the maximum density of the image to be output may be targeted maximum density. For example, the CPU 201 determines the charged potential, the exposure intensity, and the development bias based on temperature information or humidity information detected by a not-illustrated environment sensor.

After the charged potential, the exposure intensity, and the development bias are controlled, the CPU 201 determines whether or not the image forming conditions are to be changed (S120). The CPU 201 determines whether or not the gloss level setting value and the secondary transfer voltage setting value are input by the user. In a case where the gloss level setting value and the secondary transfer voltage setting value are input by the user, the CPU 201 changes the fixing temperature and the secondary transfer voltage to predetermined reference values (S121). Note that the reference value of the fixing temperature of the fixing unit 150 is 160° C. while the reference value of the fixing temperature of the fixing unit 160 is 170° C. Also, the reference value of the secondary transfer voltage is 3000V.

After the fixing temperature and the secondary transfer voltage are changed to the reference values, the CPU 201 moves the procedure to step S122. In a case where the fixing temperature and the secondary transfer voltage are not changed, the CPU 201 moves the procedure to step S122 in a similar manner.

Figure 6:
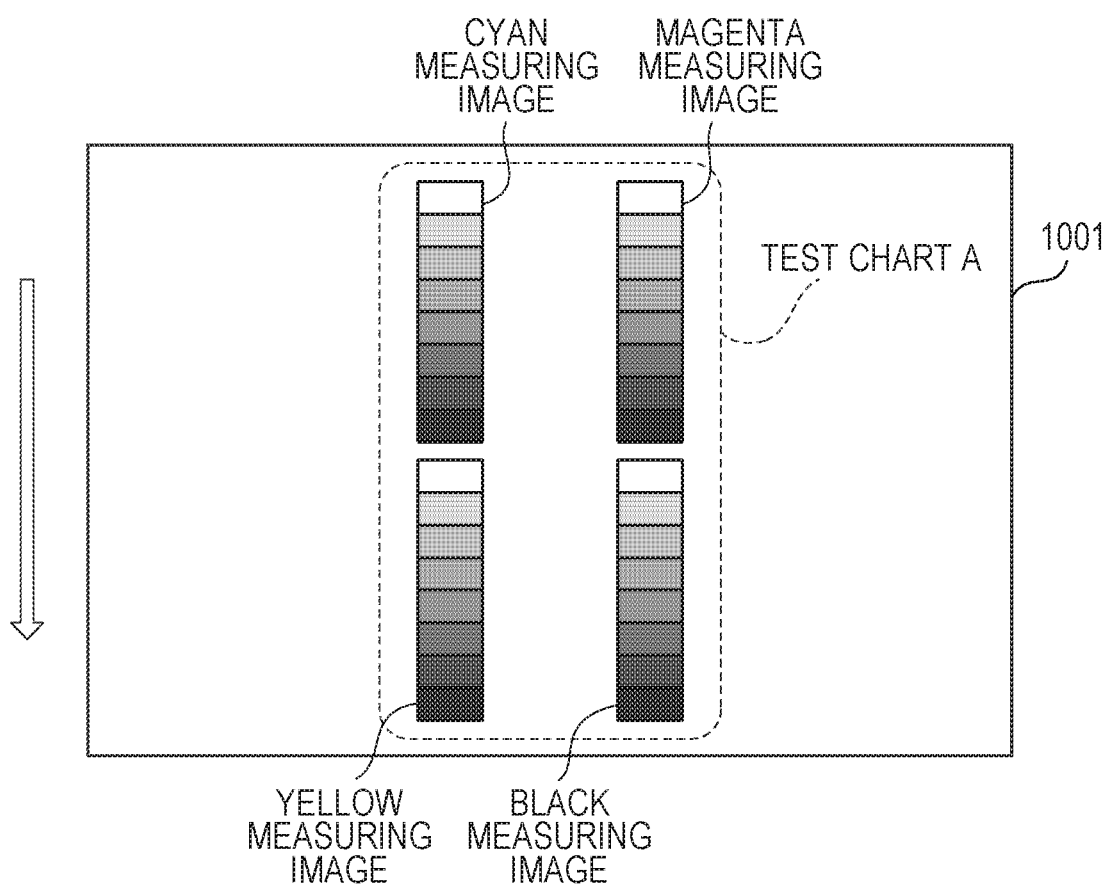
FIG. 6 is a schematic view of a test chart A for the automatic tone correction.

The CPU 201 forms a test chart A on the sheet 110 (S122). As illustrated in FIG. 6, the test chart A includes a plurality of measuring images having different tones for each color. The sheet 110 having formed thereon the test chart A is hereinbelow referred to as a test sheet 1001.

Before the test sheet 1001 is discharged from the image forming apparatus 100, the CPU 201 measures the test chart A on the test sheet 1001 by means of the sensor 117 (S123). The measurement result of the test chart A for each color is converted into adhered amount data (toner amount) by means of the conversion circuit 208. The toner amount for each color is input into the γLUT generating unit 207, and the γLUT generating unit 207 generates the γLUTP for each color based on the toner amount of the measuring image (S124).

Figure 9:
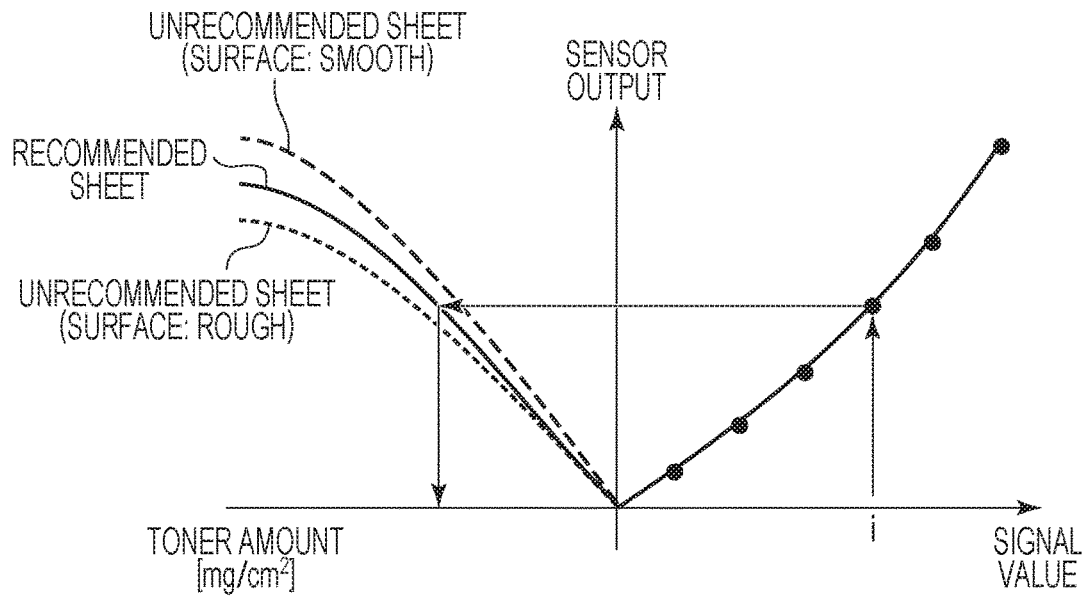
FIG. 9 illustrates a correspondence relationship among an image signal value, a sensor output, and a toner amount.

The horizontal axis of the first quadrant (right view) in FIG. 9 represents an image signal value while the vertical axis is an output value of the sensor 117. The second quadrant (left view) in FIG. 9 is a toner amount conversion table representing a correspondence relationship between the pre-stored output value and the toner amount. The toner amount conversion table is selected in accordance with the type of the recommended sheet used in the automatic tone correction. The detected toner amount is used for generation of the γLUTP illustrated in FIG. 10.

Meanwhile, the differences and curves in the left view in FIG. 9 are influenced by the component of the surface, the basis weight, and the thickness of each sheet. Thus, as for unrecommended sheets illustrated in the left view in FIG. 9, the density of a smooth sheet tends to be higher while the density of a rough sheet tends to be lower when the toner amounts are the same.

Figure 10:
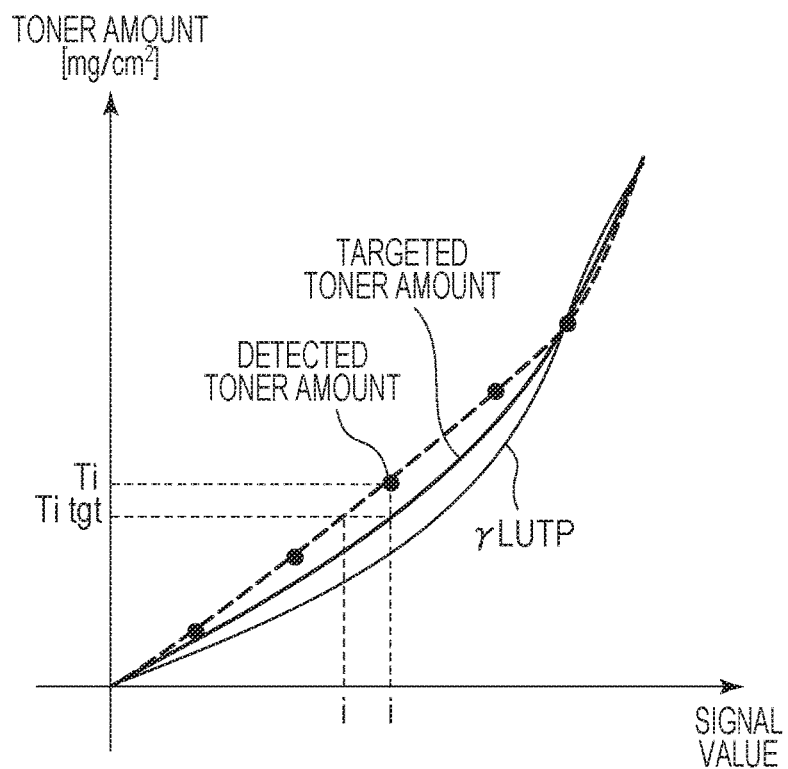
FIG. 10 illustrates a method for generating γLUTP.

FIG. 10 is a schematic view illustrating the γLUTP generated by the γLUT generating unit 207. In FIG. 10, the horizontal axis represents the image signal value when the measuring image is printed while the vertical axis represents the toner amount. The thick solid line represents ideal tone characteristics (targeted toner amount), and the dashed line represents tone characteristics of the printer 101 derived from the toner amount of the test chart A measured by the sensor 117.

To change a toner amount $T_i$ when the image signal value is i to a targeted toner amount $T_i$ tgt, the image signal value i is to be changed to an image signal value i' corresponding to the targeted toner amount $T_i$ tgt when the image signal value is i. To do so, the γLUT generating unit 207 generates the tone correction table (γLUTP) which changes the image signal value i to the image signal value i'.

(Profile Preparing Processing)

Figure 5A:
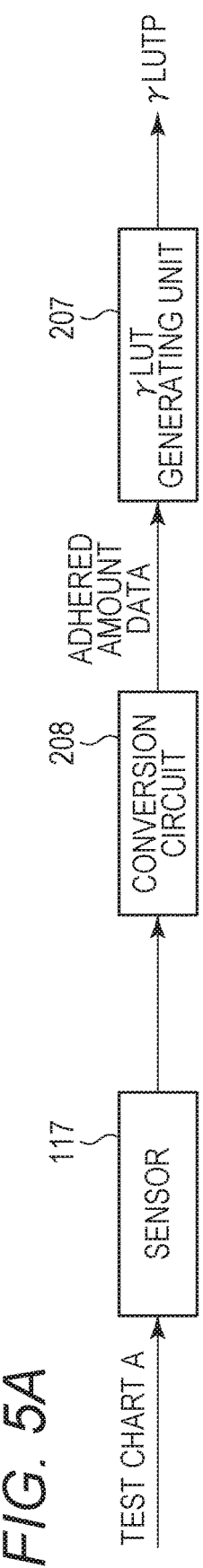
FIG. 5A is a schematic view illustrating input/output of data in automatic tone correction.
Figure 5B:
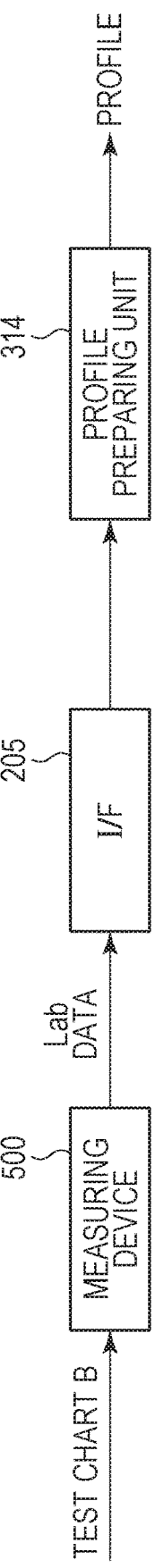
FIG. 5B is a schematic view illustrating input/output of data in profile preparing processing.
Figure 5C:
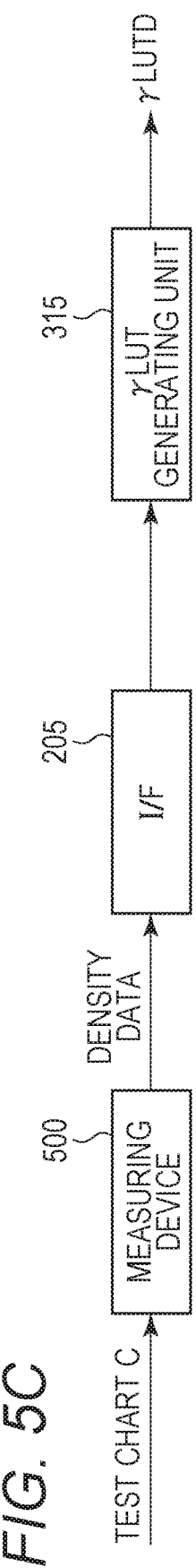
FIG. 5C is a schematic view illustrating input/output of data in DFE calibration.
Figure 13A:
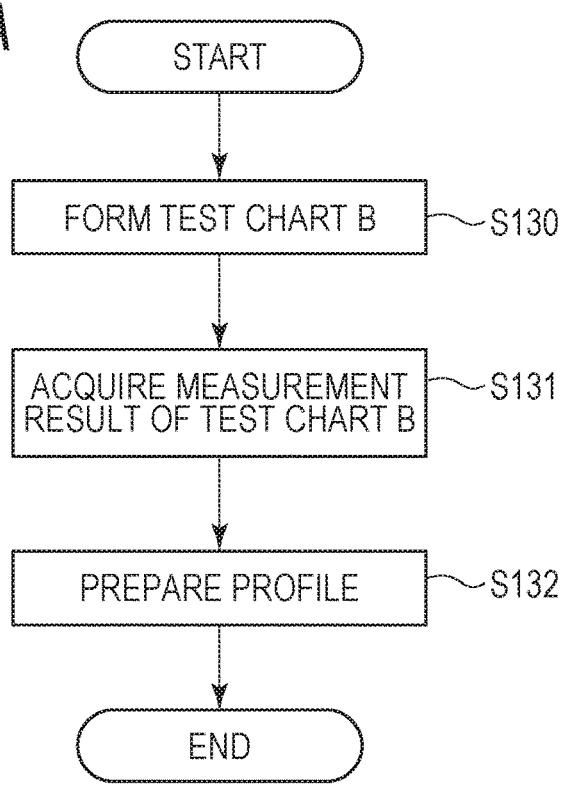
FIG. 13A is a flowchart of the profile preparation.
Figure 13B:
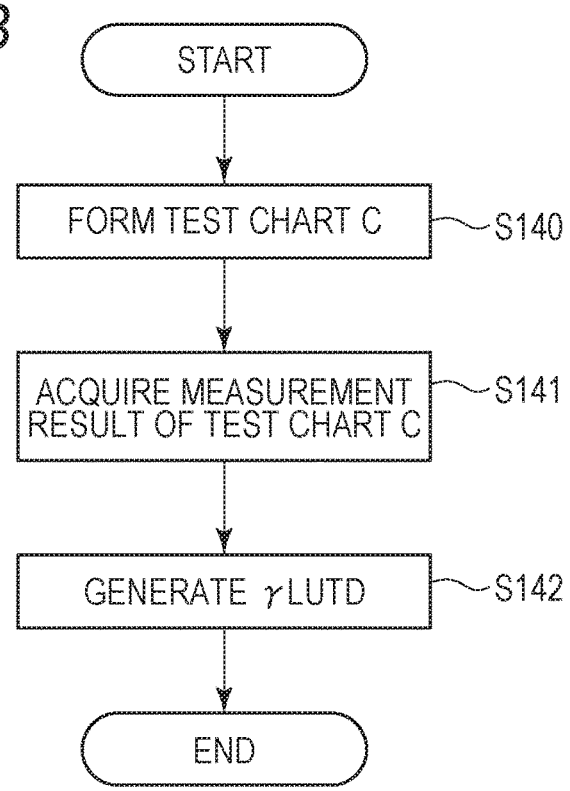
FIG. 13B is a flowchart of the DFE calibration.

Next, profile preparing processing executed by the DFE 300 according to the present embodiment will be described with reference to FIGS. 5B, 7, and 13A. While the automatic tone correction is control executed with use of the pre-specified recommended sheet, the profile preparing processing can be executed with use of the sheet 110 specified by the user.

When execution of the profile preparing processing is instructed, the CPU 311 of the DFE 300 transfers measuring image data for a test chart B stored in the HDD 316 via the printer I/F 333 to the image forming apparatus 100. The CPU 201 of the image forming apparatus 100 forms the test chart B on the sheet based on the measuring image data for the test chart B (S130).

In step S130, the tone correcting unit 211 converts the measuring image data based on the γLUTP stored in the HDD 206, and the halftone processing unit 212 provides the measuring image data with halftoning. The measuring image data image-processed by the image processor 210 is transferred to the printer 101. At this time, the CPU 201 controls the fixing temperature and the secondary transfer voltage based on the printing setting parameters that the user has set via the operating unit 180. The CPU 201 controls the printer 101 to form the test chart B on the sheet 110 based on the measuring image data.

Figure 7:
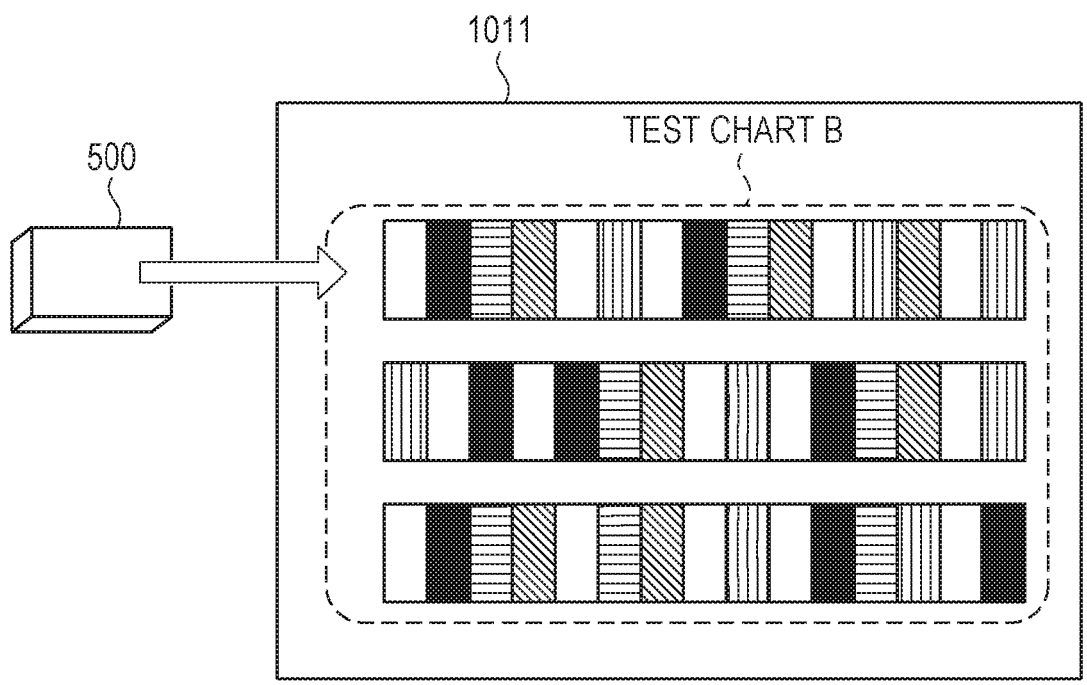
FIG. 7 is a schematic view of a test chart B for the profile preparation.

FIG. 7 is a schematic view of the sheet 110 on which the test chart B is formed. The test chart B includes yellow, magenta, cyan, and black measuring images and mixed-color measuring images. The sheet 110 having formed thereon the test chart B is referred to as a test sheet 1011.

The user operates the measuring device 500 in the arrow direction in FIG. 7 to measure the respective measuring images of the test chart B. Lab data, which is a measurement result of the respective measuring images by the measuring device 500, is input via the I/F 205 into the profile preparing unit 314 of the DFE 300 (S131). The profile preparing unit 314 performs characterization to prepare a profile (S132) and stores the profile into the HDD 316.

Meanwhile, in the profile preparing processing, single-color measuring images are formed for respective colors in the test chart B. The CPU 311 of the DFE 300 acquires density data of the single-color measuring images from the measuring device 500 and stores the density data into the HDD 316. The density data of the single-color measuring images stored in the HDD 316 is targeted density data in DFE calibration.

(DFE Calibration)

Next, DFE calibration executed in the DFE 300 will be described with reference to FIGS. 5C, 8, 11, and 13B. The DFE calibration can be executed with use of the sheet 110 specified by the user in a similar manner to the profile preparing processing. A purpose of the DFE calibration is to correct the tone characteristics to tone characteristics when the printer 101 prepares the profile. Thus, the DFE calibration is not processing of adjusting the toner amount to a target.

Figure 11:
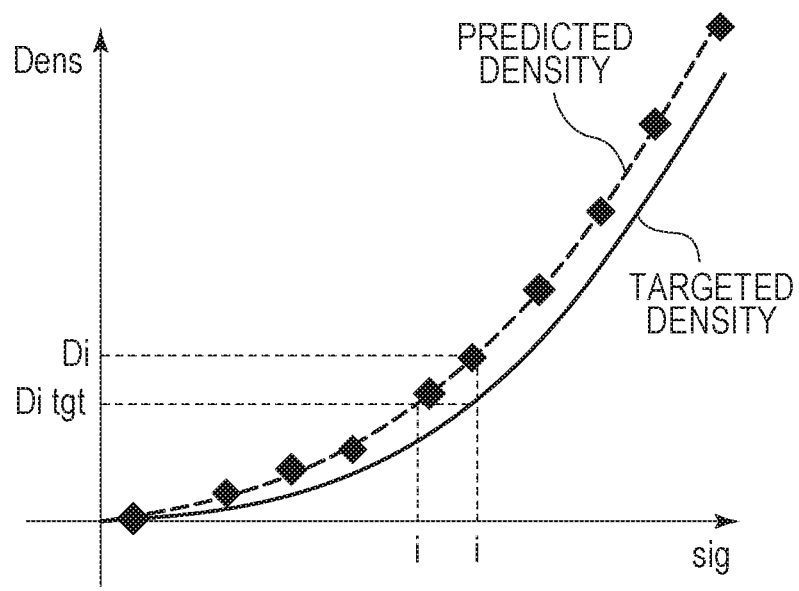
FIG. 11 illustrates a method for generating γLUTD.
Figure 12:
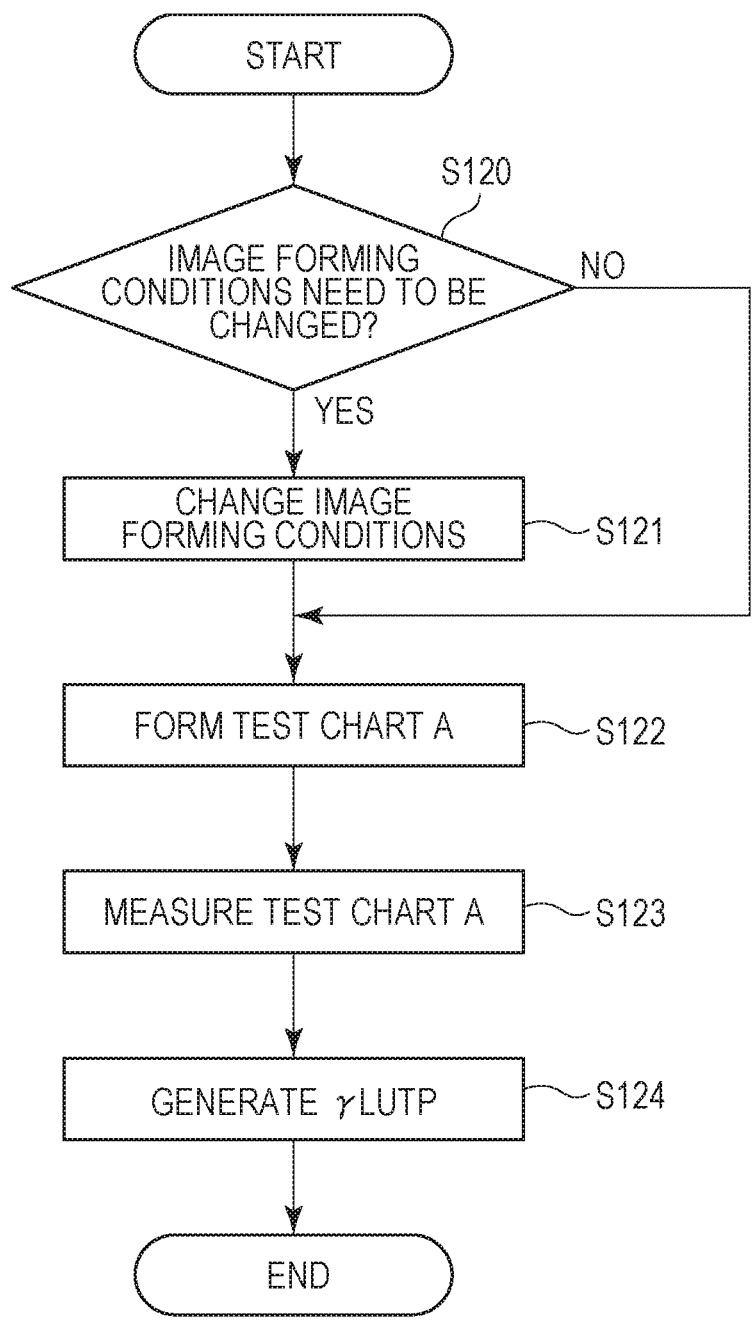
FIG. 12 is a flowchart of the automatic tone correction.

As illustrated in FIG. 11, the DFE calibration is processing of generating the γLUTD so that the density of the output image formed on the sheet 110 may be targeted density. It is to be noted that $D_i$ and $D_i$ tgt in FIG. 11 are density values, which are different from the toner amounts $T_i$ and $T_i$ tgt illustrated in FIG. 10.

When execution of the DFE calibration is instructed, the CPU 311 of the DFE 300 transfers measuring image data for a test chart C stored in the HDD 316 via the printer I/F 333 to the image forming apparatus 100. The CPU 201 of the image forming apparatus 100 forms the test chart C on the sheet 110 based on the measuring image data for the test chart C (S140). The test chart C is equivalent to a pattern image printed to generate the γLUTD. The measuring image data for the test chart C is equivalent to pattern image data.

In step S140, the tone correcting unit 211 converts the measuring image data based on the γLUTP stored in the HDD 206, and the halftone processing unit 212 provides the measuring image data with halftoning. The measuring image data image-processed by the image processor 210 is transferred to the printer 101. At this time, the CPU 201 controls the fixing temperature and the secondary transfer voltage based on the printing setting parameters that the user has set via the operating unit 180. The CPU 201 controls the printer 101 to form the test chart C on the sheet 110 based on the measuring image data.

Figure 8:
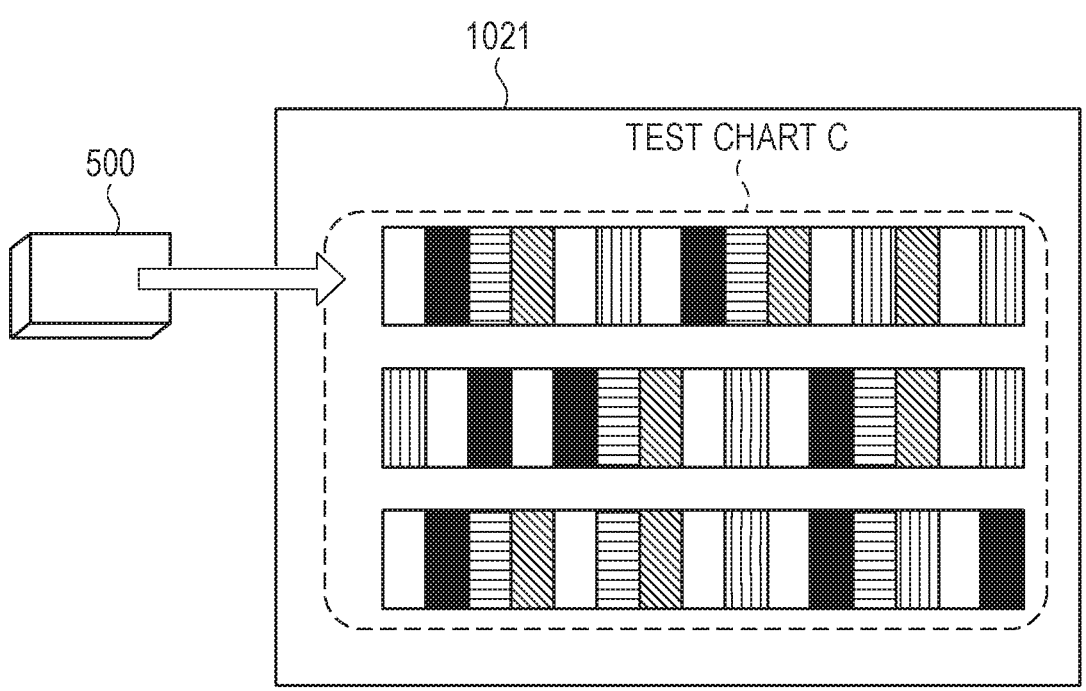
FIG. 8 is a schematic view of a test chart C for the DFE calibration.

FIG. 8 is a schematic view of the sheet 110 on which the test chart C is formed. The test chart C includes yellow, magenta, cyan, and black measuring images. The sheet 110 having formed thereon the test chart C is referred to as a test sheet 1021.

The user operates the measuring device 500 in the arrow direction in FIG. 8 to measure the respective measuring images of the test chart C. Density data, which is a measurement result of the respective measuring images by the measuring device 500, is input via the I/F 205 into the γLUT generating unit 315 of the DFE 300 (S141). The γLUT generating unit 315 generates γLUTD based on the targeted density data stored in the HDD 316 when the profile preparing processing is executed and the density data of the measuring images detected from the test chart C (S142). The γLUTD is generated for each color and is stored in the HDD 316.

The DFE calibration is control of correcting the tone characteristics of the printer 101 to the tone characteristics of the printer 101 when the profile is prepared. Thus, the DFE calibration differs from the automatic tone correction, in which the toner amount is corrected to the targeted toner amount. Accordingly, in the DFE calibration, the test chart C is formed with used of the fixing temperature and the secondary transfer voltage determined based on the gloss level setting value and the secondary transfer voltage setting value that the user has arbitrarily set.

Hereinbelow, examples will be described.
(Pattern 1)
Automatic Tone Correction
Gloss Level Setting Value: +2
Secondary Transfer Voltage Setting Value: −3

In a case where the automatic tone correction is executed, the following setting values are employed based on a table representing a relationship between a calibration mode and test chart printing conditions (image forming conditions for test chart formation) illustrated in FIG. 14A.
First Fixing Temperature (Fixing Unit 150): 160° C.
Second Fixing Temperature (Fixing Unit 160): 170° C.
Secondary Transfer Voltage: 3000V The purpose of the automatic tone correction is to detect the toner amount on the recommended sheet and correct the tone characteristics to achieve the targeted toner amount. Thus, in a case where the test chart is printed based on the gloss level setting value and the second transfer voltage setting value that the user arbitrarily sets, and where the detected toner amount differs due to the user's setting values, the toner amount of the output image cannot be a desired toner amount. In the image forming apparatus 100, since the tone characteristics on the recommended sheet are corrected by correcting the toner amount, the tone characteristics do not become ideal tone characteristics. For this reason, even in a case where the gloss level setting value and the second transfer voltage setting value are set by the user, the test chart A is formed with use of the predetermined temperatures (the first fixing temperature and the second fixing temperature) and the predetermined voltage (the secondary transfer voltage).

(Pattern 2)
DFE Calibration
Gloss Level Setting Value: +2
Secondary Transfer Voltage Setting Value: −3

In a case where the DFE calibration is executed, the respective parameters are controlled based on the user's setting values as illustrated in FIG. 14A. That is, the first fixing temperature and the second fixing temperature are determined to be the following values based on a table representing a relationship between the gloss level setting value and the fixing temperature illustrated in FIG. 14B.
First Fixing Temperature: 165° C.
Second Fixing Temperature: 175° C.

Also, the secondary transfer voltage is determined to be the following value based on a table representing a relationship between the secondary transfer voltage setting value and the secondary transfer voltage illustrated in FIG. 14C.
Secondary Transfer Voltage: 2250V With the image forming apparatus 100 according to the present embodiment, image forming conditions can be controlled appropriately in accordance with calibration.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2017-109254, filed Jun. 1, 2017, which is hereby incorporated by reference herein in its entirety.

What is claimed is:

1. An image forming system comprising:
a first image processor configured to convert an image data based on a first conversion condition;
a second image processor configured to convert the image data based on a second conversion condition;
a printer configured to form an image on a sheet, the printer comprising a photosensitive body, an exposing device that exposes the photosensitive body to form an electrostatic latent image based on the image data converted by the second image processor, a developing sleeve that develops the electrostatic latent image, a transfer roller that transfers the image onto the sheet, and a fixing member that heats the image on the sheet to fix the image on the sheet;
an operation panel configured to obtain user instruction information related to a user's setting temperature of the fixing member; and
a controller configured to:
control, in a case where the printer forms the image, a fixing temperature of the fixing member based on the user's setting temperature;
control the fixing temperature of the fixing member based on the user's setting temperature, in a first mode in which the printer forms a first measuring image for generating the first conversion condition; and
control the fixing temperature of the fixing member based on a reference temperature regardless of the user's setting temperature, in a second mode in which the printer forms a second measuring image for generating the second conversion condition.

2. The image forming system according to claim 1, further comprising:
a sensor configured to measure the second measuring image formed on the sheet,
wherein the sensor is provided in a conveyance path of the sheet on which the second measuring image is formed.

3. The image forming system according to claim 1,
wherein the user instruction information includes information of a gloss level of an image to be formed on the sheet.

4. The image forming system according to claim 1,
wherein the controller controls the second image processor to convert measuring image data based on the second conversion condition, and controls the printer to form the first measuring image based on the converted measuring image data.

5. The image forming system according to claim 1,
wherein the first conversion condition includes a profile to be used in color conversion.

6. The image forming system according to claim 1,
wherein the first conversion condition includes a tone correction condition for controlling a tone characteristic of an image to be formed by the printer.

7. The image forming system according to claim 1,
wherein the second conversion condition includes a tone correction condition for controlling a tone characteristic of an image to be formed by the printer.

8. The image forming system according to claim 1,
wherein the first measuring image includes a mixed color image.

9. An image forming system comprising:
a first image processor configured to convert an image data based on a first conversion condition;
a second image processor configured to convert the image data based on a second conversion condition;
a printer configured to form an image on a sheet, the printer comprising a photosensitive body, an exposing device that exposes the photosensitive body to form an electrostatic latent image based on the image data converted by the second image processor, a developing sleeve that develops the electrostatic latent image, a transfer roller that transfers the image onto the sheet, and a fixing member that heats the image on the sheet to fix the image on the sheet;
an operation panel configured to obtain user instruction information related to a user's setting voltage to be supplied to the transfer roller; and
a controller configured to:
control, in a case where the printer forms the image, a transfer voltage to be supplied to the transfer roller based on the user's setting voltage;
control the transfer voltage to be supplied to the transefer roller based on the user's setting voltage, in a first mode in which the printer forms a first measuring image for generating the first conversion condition; and
control the transfer voltage to be supplied to the transefer roller based on a reference voltage regardless of the user's setting voltage, in a second mode in which the printer forms a second measuring image for generating the second conversion cndition.

10. The image forming system according to claim 9, further comprising:
a sensor configured to measure the second measuring image formed on the sheet,
wherein the sensor is provided in a conveyance path of the sheet on which the second measuring image is formed.

11. The image forming system according to claim 9,
wherein the controller controls the second image processor to convert measuring image data based on the second conversion condition, and controls the printer to form the first measuring image based on the converted measuring image data.

12. The image forming system according to claim 9,
wherein the first conversion condition includes a profile to be used in color conversion.

13. The image forming system according to claim 9,
wherein the first conversion condition includes a tone correction condition for controlling a tone characteristic of an image to be formed by the printer.

14. The image forming system according to claim 9,
wherein the second conversion condition includes a tone correction condition for controlling a tone characteristic of an image to be formed by the printer.

15. The image forming system according to claim 9,
wherein the first measuring image includes a mixed color image.

* * * * *